Patented May 11, 1943

2,318,920

UNITED STATES PATENT OFFICE 2,318,920

INGREDIENTS FOR AGRICULTURAL PARASITICIDES

Kenneth R. Brown, Tamaqua, Pa., assignor to Atlas Powder Company, Wilmington, Del., a corporation of Delaware No Drawing. Application December 21, 1939, Serial No. 310,351

16 Claims. (Cl. 167—33)

The present invention relates to ingredients for agricultural parasiticides.

An object of the invention is to provide an improved insecticide for agricultural use.

A further object of the invention is to provide an efficient and highly economical insecticide comprising a novel toxic ingredient useful in the control of soft-bodied, sucking insects.

A still further object is to provide an agricultural spray containing an ingredient which is itself toxic to soft-bodied, sucking insects and which further acts as a highly efficient spreader and wetting agent in conjunction with other toxic compounds.

Insecticides in general can be divided into those containing substances which kill or paralyze by contact, such as pyrethrum or nicotine sulfate, and those containing substances which kill upon ingestion by the insect, such as rotenone or metallic poisons like lead arsenate. In either type of insecticide the primary problem is to wet the insect or the leaf upon which it feeds with the toxic material. Both insects and plants are provided by nature with water resistant coverings of a waxy or oily nature which renders it difficult to wet them efficiently with an aqueous insecticide and without efficient wetting there can be no useful distribution of the toxic material. From the standpoint of economy, particularly in agricultural insect control, it is highly desirable to use water as the medium for distributing the toxic material. Water also has no ill effect on the plant whereas some of the materials that wet insects and plants more readily than water have detrimental effects.

It is, therefore, usual to include in an insecticidal spray some type of wetting and spreading agent such as soap, sulphonated oil, soy bean flour or the like, materials which have little or no insecticidal value of themselves and are largely inert materials in the sprays.

The insecticidal materials ordinarily incorporated into sprays are relatively insoluble in water and difficult to disperse completely. This fact renders the preparation of the sprays difficult in the first place.

Also, many of the most efficient insecticidal materials are highly poisonous to animals which necessitates great care in the use of sprays containing them on plants intended for use as food and requires careful washing and inspection of food plants so sprayed before they can be used.

A subject closely related to insecticides in agriculture is that of fungicides. These fungicides are usually insoluble substances and offer great resistance to wetting which makes them difficult to spread on the plants to be treated and curtails their effectiveness.

I have found a composition which is a highly efficient contact poison to many insects and in addition has excellent emulsifying and spreading properties. This material is also non-poisonous to animals. It is self-emulsifying in water at ordinary temperature and can be added to water in any proportions to make a contact spray for use in the control of insects of the class described below. In addition to sprays including this ingredient alone where it acts as its own spreader, it has been found highly advantageous to make use of its emulsifying properties by including it in a spray with another insecticidal substance. Due to the combination of toxic and emulsifying properties, sprays containing my new material and one of the ordinary insecticides have greatly improved insect controlling properties as compared to the same ordinary insecticide with a spreader of the type formerly employed.

In addition to the above uses, the material of the invention is useful as an emulsifier and spreader for fungicidal sprays, and sprays in which sulphur forms the active ingredient such as those used in the control of scale insects. Such a spray will therefore have the insecticidal properties of my material in addition to having superior wetting and spreading characteristics which assist the other active material.

The material used in accordance with the present invention is a water-dispersible composition comprising partial lauric acid ester of an inner ether derivable from a hexitol, as for example the technical (as distinguished from pure crystalline compounds) monolaurates, dilaurates and trilaurates of mannitan and sorbitan and the technical monolaurates of mannide and sorbide. The esterifiable inner ethers derivable from hexitols consist of the monoanhydro hexitols or hexitans (mannitan, sorbitan, etc.) and the dianhydro hexitols or hexides (mannide, sorbide, etc.). By "water-dispersible composition comprising partial lauric acid ester of an inner ether" is meant a composition comprising a substantial proportion of at least one such ester and in addition other reacted and/or unreacted material, generally hydroxylic and/or acidic in character, and comprising at least a portion of the by-products of the reaction of hexitol or inner ethers derivable therefrom with fatty oil or fatty acid, such other material being present in the composition in sufficient complexity and amount to render the composition water-dispersible. The pure crystalline single esters will frequently be found ineffective, an important reason for which being that they may neither emulsify with, nor dissolve in, water. However, in the presence of other materials such as the by-products obtained by the esterification of hexitol with commercial lauric acid, they form water-dispersible compositions having excellent emulsifying properties. It is to be understood that I also contemplate the use of the technical reaction products from which fractions of these by-products have been removed so long as the technical product retains a sufficient complexity of ingredients as to render it water-dispersible. Conversely, the water-dispersible compositions may be synthesized by the addition to the relatively pure esters of suitable auxiliary materials such as the by-products referred to above to form a composition which is readily water dispersible.

A water dispersible composition which contains mannitan monolaurate can be prepared, for example, by reacting mannitol with lauric acid, in the presence of an alkaline catalyst such as NaOH or $Na_2CO_3$, at about 200–300° C. or under other conditions in which a molecule of water is split off the mannitol to form its inner ether mannitan. The product of this reaction comprises a large portion of mannitan monolaurate and may also comprise some higher esters of mannitan, unreacted mannitan and mannide mono- and di-esters. Under similar conditions mannitol can be reacted in a mol for mol ratio with the mixed fatty acids (predominantly lauric acid) derived from coconut oil.

Preferable to the composition of esters or of the mixed esters just mentioned is the product of an alcoholysis reaction between the hexitol and coconut oil under conditions in which the hexitol loses water and forms an inner ether and the ether becomes partially esterified with fatty acid (predominantly lauric) split away from the glycerol with which it is combined in the oil. This product comprises a large amount of the partial lauric acid esters of an inner ether derivable from a hexitol, varying amounts of partial esters of other fatty acids and inner ether derivable from a hexitol, and partial fatty acid esters of glycerol. The products of this type are preferable because they have, in general, somewhat better wetting and spreading characteristics than the other type described above, slightly better insecticidal properties, are readily available and economical to prepare.

Such an alcoholysis product can be prepared, for example, by reacting 2 mols mannitol with 1 mol coconut oil in the presence of an alkaline catalyst and at about 200–300° C. The use of twice as much mannitol as oil is for the purpose of forming the monoesters when two fatty acid molecules are freed by splitting the triglyceride. The alkaline catalyst, for instance, NaOH or $Na_2CO_3$, assists in forming the inner ether mannitan from the mannitol under the conditions of the reaction. The product comprises a large portion of mannitan monolaurate, mannitan monoesters of other fatty acids derivable from coconut oil, partial (largely mono-) fatty acid glycerides, and in addition to these may comprise small amounts of higher mannitan esters, unesterified mannitan, and some mannide mono- and di-esters. For convenience this derivative will be referred to hereinafter as "mannitan coconut oil derivative."

While the partial lauric acid esters of all of the inner ethers derivable from the hexitols are useful in this invention, the monolauric acid ester of mannitan is preferred because of its high insecticidal value, especially in the presence of related substances such as those formed in the above-described alcoholysis reaction.

The invention is not to be taken as limited to any particular manner of preparing the material to be used. Various ways of preparing partial lauric acid esters of inner ethers derivable from hexitols will be apparent to those skilled in this art. The inner ethers derivable from the hexitols and forming the esterification product with the acid may be employed directly in the reaction, although, as pointed out above, the inner ether may be formed under the conditions of and during the esterification reaction by utilizing the polyhydric alcohol as the initial material. While mannitol and sorbitol derivatives are preferable because of their availability, the derivatives of the other isomeric hexitols are also within the scope of invention.

The novel ingredient of the invention, possesses a very high degree of toxicity to soft-boiled, sucking insects such as aphids and the like. For example, an insecticidal spray containing mannitan coconut oil derivative in dilutions up to 1 part in 1000 parts of water has been found to give very good kills on this type of insects. Whereas a spray giving 60% kills or better is acceptable in this art, the sprays prepared according to the invention give much higher kills in may cases of insects difficult to control. The sprays are readily prepared since the toxic agent requires no processing to get it into the vehicle. The novel toxic material is relatively inexpensive as compared to the usual contact poisons such, for example, as nicotine sulfate. Because of the great wetting powers of the spray, the plants and also the insects exposed on the plants are completely wetted and this fact greatly increases the rate of kill as compared to the less efficient wetting agents formerly employed.

In addition to the soft-bodied, sucking insects which are killed in all stages of growth, the product of the invention has a very high insecticidal value against the larvae and particularly the small larvae of a number of other types of insects.

The excellent wetting properties of solutions of this product make them highly successful spreaders for use in combination with other toxic agents. For example, another contact poison such nicotine sulfate which has usually very poor spreading properties can be combined and the effect of the spray enhanced due to the addition of properties of the nicotine.

The properties of these materials used according to the invention as spreaders adapt them also for use in conjunction with stomach poisons such as rotenone and arsenic-containing poisons like calcium and lead arsenates.

An insecticide comprising the spreader according to the invention and a stomach poison has therefore two types of toxic agents in a spray which has excellent spreading and wetting properties. The ester, besides acting as the spreading agent, gives the properties of a highly efficient contact poison against the class of insects named, while the stomach poison is effective against these and other insects which are not destroyed by the ester alone.

In the cases where the composition of the invention is used as a spreader for an arsenic-containing stomach poison care must be taken to use the mixture only on crops which are not sensitive to soluble arsenic in the concentrations developed. Crops such as peach and bean are generally too sensitive to soluble arsenic and the use of such sprays on these crops will result in burning them. The amount of soluble arsenic in a mixed spray according to the invention can be kept low and within the limits permissible for most crops by keeping the quantity of spreader down. For example, a spray containing 0.5% mannitan coconut oil derivative along with lead arsenate will give less than 0.5% soluble arsenic which is within the permissible limit for most crops.

The products described for use in this invention are harmless to most plants even in concentrations as high as 1 part in 100 parts of water. Tests involving about 50 types of plants, including truck crops such as cabbage, potato and bean, flowers and flowering plants including snap dragons, which is a particularly sensitive one, and orchard plants including peach, which is a particularly sensitive member of this group, showed no injury to these plants when sprays containing mannitan coconut oil derivative were used.

An unusual advantage of the use of the mannitan coconut oil derivative as a contact poison is found in the case of controlling the cabbage aphid (*Brevicoryne brassicae*). It has been found that whereas a spray containing this novel agent gives substantially complete kills of the individuals hit by the spray, the parasites which infest this aphid are not injured. It is recogized that these parasites eventually destroy the aphid particularly when their resistance becomes low toward the end of the season so that an aphid which has only been incompletely contacted by the spray and is not killed will still have the parasites to destroy it eventually. This effect is more remarkable because nicotine sulfate, which is the usual contact poison employed to control this insect, kills both the aphid and its parasites.

Another specific advantage of this same derivative is that the young of the potato leafhopper (*Empoasca fabae*) is killed whenever it is struck by the spray, whereas nicotine sulfate by itself is not effective against this insect.

The following table gives the results of tests in which sprays were used with the novel ingredients of the invention as the sole active agent. The plants indicated were infested with the insects and the sprays were applied to the plants in the customary way from hand spraying equipment. "Mannitan mixed fatty acid esters" refers to the reaction product of mannitol and the fatty acids of coconut oil which product contains a large amount of mannitan monolaurate.

The above table is intended as illustrative of the effect of the insecticide but is by no means complete and the invention is not restricted in application to the control of these insects alone.

In a large scale field test on cabbage aphid a solution of 1 part of the mannitan coconut oil derivative in 1000 parts of water gave substantially complete kills of the insects hit by the spray and the spray had excellent wetting properties.

The effectiveness of sprays containing other toxic agents in addition to the mannitan ester is witnessed by the following examples:

Example 1

A spray was prepared by mixing 1 part of mannitan coconut oil derivative with 100 parts of water and adding 0.1% pyrethrum extract which contained 20% pyrethrins. This spray was tested for effectiveness against the Japanese beetle (*Popillia japonica*). After 72 hours 2 test groups showed kills of 82.2% and 86.8% respectively.

For comparison, a similar spray containing 0.5% of a soap in place of the mannitan ester gave less than a 50% kill under similar conditions.

Example 2

A spray was prepared containing 1 part of mannitan coconut oil derivative in 100 parts of water and also 0.1% pyrethrum extract containing 20% pyrethrins. This spray was tested for effectiveness against the adult Mexican bean beetle (*Epilachna varivestis*). After 24 hours an 82% kill was noted.

Example 3

(a) A spray was made up with 1 part of mannitan coconut oil derivative in 400 parts of water. To 12½ pints of the mixture 1½ oz. cube (5% rotenone) powder were added. This spray was found effective against half grown or small cabbage loopers (*Autographa brassicae*). The spray so prepared gave a kill of 80% in tests against this insect.

(b) For comparison a test was made using 1 part mannitan coconut oil derivative to 400 parts of water against the same insect and in two tests kills of 74% and 66% respectively were noted.

(c) To compare the effect of the rotenone alone,

*Table I*

| Insecticide | Concentration | Plant | Insect | Kill Time elapsed | Dead |
|---|---|---|---|---|---|
| | | | | Hours | Per cent |
| Mannitan mixed fatty acid esters | 0.5% in water | Dwarf nasturtium | Bean aphid (*Aphis rumicis*) | 48 | 94.1 |
| Mannitan coconut oil derivative | 1% in water | Crataegus | Lace bug (*Corythucha bellula*) | 24 | 89.2 |
| Mannitan mixed fatty acid esters | do | do | do | 24 | {89.3 / 95.4} |
| Mannitan coconut oil derivative | do | Potato | Potato leafhopper (*Empoasca fabae*) | 24 | {98.8 / 97.1} |
| Do | do | do | Pink and green potato aphid (*Macrosiphum (Illinoia) solanifolii*) | 24 | {89.1 / 88.6} |
| Do | 0.5% in water | do | Potato leafhopper (*Empoasca fabae*) | 24 | 100 |
| Mannitan mixed fatty acid esters | do | do | do | 24 | 97.6 |
| Mannitan coconut oil derivative | 0.25% in water | Nasturtium | Aphid (*Aphis rumicis*) | 24 | {63.4 / 57.6} |
| Mannide monolaurate | 0.5% in water | do | do | 48 | 79.4 |
| Mannitan coconut oil derivative | 0.01% in water | Cabbage | Cabbage aphid (*Breviocryne brassicae*) | 24 | 100 |
| Do | do | do | Mosquito larvae (*Culex quinquefasciatus*) | 24 | 100 |
| Mannitan dilaurate | do | do | do | 24 | 75 |
| Mannide monolaurate | do | do | do | 24 | 100 |
| Sorbitan monolaurate | do | do | do | 24 | 65 |
| Mannitan coconut oil derivative | 1% in water | Bean | Small Mexican bean beetle larvae (*Epilachna varivestis*) | 24 | 88.2 |
| Do | do | do | Leafhopper (*Empoasca fabae*) | 24 | 100 |
| Do | do | Squash | Squash bugs (*Anasa tristis*) | 24 | {100 / 73.3} | a spray was made up containing the same concentration of cube (5% rotenone) powder as in part (a) and containing in addition soy bean flour in the ratio of 1 lb. to 100 gallons of water. The soy bean flour is a common inert spreader used in such sprays and has of itself no insecticidal properties. This spray was used against the cabbage loopers and resulted in a kill of 66%.

Example 4

An insecticide was prepared with 1% mannitan coconut oil derivative in water and lead arsenate in the proportion of 4.7 g. per liter of water. This insecticide combined the effects of the contact poison and spreader (mannitan coconut oil derivative) and the stomach posion lead arsenate.

Many plants including apple (sprayed in the field) and tomato, tobacco and potato (sprayed in the hothouse) showed no injurious effects from the spray whereas peach showed injury in the form of a burning of the leaves.

Certain of the esters described herein are described and claimed in my copending application Serial Number 252,548.

The invention is not to be taken as limited in its scope or its application to the specific illustrations and examples given above but only by the following claims.

I claim:

1. An insecticide containing as an active ingredient a water-dispersible composition comprising partial lauric acid ester of a compound selected from the class consisting of hexitans and hexides.

2. An insecticide containing as an active ingredient a water-dispersible composition comprising the reaction product of a polyhydroxy material selected from the group consisting of hexitols, hexitans and hexides, and material selected from the class consisting of coconut oil and fatty acids derivable therefrom, said product comprising a substantial amount of partial lauric acid ester of a compound selected from the class consisting of hexitans and hexides.

3. An insecticide containing as an active ingredient a water-dispersible composition comprising partial lauric acid ester of mannitan.

4. An insecticide containing as an active ingredient a water-dispersible composition comprising the reaction product of a polyhydroxy material selected from the group consisting of mannitol and mannitan, and material selected from the group consisting of coconut oil and fatty acids derivable therefrom, said product comprising a substantial amount of mannitan monolaurate.

5. An insecticide containing as an active ingredient a water-dispersible composition comprising partial lauric acid ester of sorbitan.

6. An insecticide containing as an active ingredient a water-dispersible composition comprising the reaction product of a polyhydroxy material selected from the group consisting of sorbitol and sorbitan, and material selected from the group consisting of coconut oil and fatty acids derivable therefrom, said product comprising a substantial amount of sorbitan monolaurate.

7. An insecticidal spray for the control of soft bodied sucking insects comprising a dispersion in water of a partial lauric acid ester of a compound selected from the class consisting of hexitans and hexides.

8. An insecticidal spray for the control of soft bodies sucking insects comprising a dispersion in water of a water-dispersible composition comprising the reaction product of a polyhydroxy material selected from the group consisting of hexitols, hexitans and hexides, and materials selected from the class consisting of coconut oil and fatty acids derivable therefrom, said product comprising a substantial amount of partial lauric acid ester of a compound selected from the class consisting of hexitans and hexides.

9. An insecticidal spray for the control of soft bodied sucking insects comprising a dispersion in water of a water-dispersible composition comprising partial lauric acid ester of mannitan.

10. An insecticidal spray for the control of soft bodied sucking insects comprising a dispersion in water of a water-dispersible composition comprising the reaction product of a polyhydroxy material seelcted from the group consisting of mannitol and mannitan, and material selected from the group consisting of coconut oil and fatty acids derivable therefrom, said product comprising a substantial amount of mannitan monolaurate.

11. An insecticidal spray for the control of soft bodied sucking insects comprising a dispersion in water of a water-dispersible composition comprising partial lauric acid ester of sorbitan.

12. An insecticidal spray for the control of soft bodied sucking insects comprising a dispersion in water of a water-dispersible composition comprising the reaction product of a polyhydroxy material selected from the group consisting of sorbitol and sorbitan, and material selected from the group consisting of coconut oil and fatty acids derivable therefrom, said product comprising a substantial amount of soribtan monolaurate.

13. An agricultural spray comprising a difficultly dispersible toxic ingredient, water, and a small amount of a water-dispersible composition comprising a partial lauric acid ester of a compound selected from the class consisting of hexitans and hexides.

14. An agricultural spray comprising a difficultly dispersible toxic ingredient, water, and a small amount of the reaction product of coconut oil and mannitol, said product comprising a substantial amount of mannitan monolaurate.

15. The process of controlling insect infestations on plants which comprises applying to the infested plants an aqueous spray containing as an active ingredient a water-dispersible composition comprising partial lauric acid ester of a compound selected from the class consisting of hexitans and hexides.

16. The process of controlling insect infestations on plants which comprises applying to the infested plants an aqueous spray containing as an active ingredient a water-dispersible composition comprising the reaction product of coconut oil and mannitol, said product containing a substantial amount of mannitan monolaurate.

KENNETH R. BROWN.